(12) United States Patent
Bachelder et al.

(10) Patent No.: US 9,361,499 B2
(45) Date of Patent: Jun. 7, 2016

(54) BARCODE DECODING

(71) Applicant: Cognex Corporation, Natick, MA (US)

(72) Inventors: Ivan A. Bachelder, Hillsborough, NC (US); Savithri Vaidyanathan, Hopkinton, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/511,030

(22) Filed: Oct. 9, 2014

(65) Prior Publication Data

US 2016/0104020 A1    Apr. 14, 2016

(51) Int. Cl.
*G06K 5/04* (2006.01)
*G06K 7/10* (2006.01)
*G06K 9/00* (2006.01)
*G06K 7/14* (2006.01)

(52) U.S. Cl.
CPC .......... *G06K 7/1439* (2013.01); *G06K 7/10821* (2013.01)

(58) Field of Classification Search
CPC ............. G06K 5/04; G06K 7/10; G06K 9/00; G06K 9/36; G06K 9/80; G06K 9/18
USPC ................ 235/462.12, 462.1, 462.09, 462.01
See application file for complete search history.

(56) References Cited

U.S. PATENT DOCUMENTS

| | | | |
|---|---|---|---|
| 5,444,231 A | 8/1995 | Shellhammer et al. | |
| 5,486,689 A | 1/1996 | Ackley | |
| 5,514,858 A | 5/1996 | Ackley | |
| 5,539,191 A | 7/1996 | Ackley | |
| 5,821,519 A | 10/1998 | Lee et al. | |
| 6,315,201 B1 | 11/2001 | Reichenbach et al. | |
| 6,394,352 B1* | 5/2002 | De Renzis | G06K 7/14 235/462.12 |
| 6,513,714 B1 | 2/2003 | Davis et al. | |
| 7,000,838 B2 | 2/2006 | Lapinski et al. | |
| 2005/0224581 A1* | 10/2005 | Reichenbach | G06K 7/14 235/462.12 |
| 2009/0121027 A1 | 5/2009 | Nadabar | |
| 2011/0309138 A1* | 12/2011 | Wu | G06K 7/1452 235/375 |

* cited by examiner

*Primary Examiner* — Edwyn Labaze

(57) ABSTRACT

Systems and methods for decoding a barcode are disclosed. A scan signal for a first portion of the barcode is acquired. Integrated sub-character barcode feature evidence for the barcode is stored including evidence for a first plurality of possible sub-character barcode feature interpretations for a first plurality of sub-character barcode features. Sub-character barcode feature measurements are extracted for a second plurality of sub-character barcode features from the scan signal. Sub-character barcode feature evidence is determined for the second plurality of sub-character barcode features, including evidence for a second plurality of possible sub-character barcode feature interpretations for the second plurality of sub-character barcode features. Whether a portion of the integrated sub-character barcode feature evidence corresponds to a portion of the sub-character barcode feature evidence is determined. The sub-character barcode feature evidence is integrated into the integrated sub-character barcode. Character values are determined from the integrated sub-character barcode feature evidence.

20 Claims, 14 Drawing Sheets

FIG. 6

| Label | c1 | c2 | c3 | c4 | Group |
|---|---|---|---|---|---|
| 610a | 1.0 | 0.0 | 0.0 | 0.0 | |
| 610b | 0.0 | 0.0 | 0.5 | 0.5 | |
| 610c | 0.0 | 0.7 | 0.3 | 0.0 | |
| 610d | 0.7 | 0.3 | 0.0 | 0.0 | |
| 610e | 0.8 | 0.2 | 0.0 | 0.0 | |
| 605f | 0.0 | 0.0 | 0.3 | 0.7 | |
| 610g | 0.8 | 0.2 | 0.0 | 0.0 | 615a |
| 610h | 1.0 | 0.0 | 0.0 | 0.0 | 615a |
| 610i | 0.0 | 0.6 | 0.4 | 0.0 | 615a |
| 610j | 0.0 | 1.0 | 0.0 | 0.0 | 615a |
| 610k | 0.8 | 0.2 | 0.0 | 0.0 | 615b |
| 610l | 0.1 | 0.9 | 0.0 | 0.0 | 615b |
| 610m | 0.0 | 0.1 | 0.9 | 0.0 | 615b |
| 610n | 0.2 | 0.8 | 0.0 | 0.0 | 615b |
| 610o | 0.0 | 0.9 | 0.1 | 0.0 | 615b |
| 610p | 0.5 | 0.5 | 0.0 | 0.0 | 615b |
| 610q | 0.5 | 0.5 | 0.0 | 0.0 | |
| 610r | 0.0 | 0.7 | 0.3 | 0.0 | 615c |
| 610s | 0.0 | 0.5 | 0.5 | 0.0 | 615c |
| 610t | 0.3 | 0.7 | 0.0 | 0.0 | 615c |
| 610u | 1.0 | 0.0 | 0.0 | 0.0 | 615c |
| 610v | 0.7 | 0.3 | 0.0 | 0.0 | 615c |
| 610w | 0.0 | 0.5 | 0.5 | 0.0 | |

| | | | | |
|---|---|---|---|---|
| 1.0 | 0.0 | 0.0 | 0.0 | 810a |
| 0.0 | 0.0 | 0.1 | 0.9 | 810b |
| 0.8 | 0.2 | 0.0 | 0.0 | 810c |
| 0.7 | 0.3 | 0.0 | 0.0 | 810d |
| 0.0 | 0.8 | 0.2 | 0.0 | 810e |
| 0.3 | 0.7 | 0.0 | 0.0 | 810f |
| 1.0 | 0.0 | 0.0 | 0.0 | 810g |
| 0.2 | 0.8 | 0.0 | 0.0 | 810h |
| 0.0 | 0.2 | 0.8 | 0.0 | 810i |
| 0.0 | 0.8 | 0.2 | 0.0 | 810j |
| 0.0 | 0.7 | 0.3 | 0.0 | 810k |
| 1.0 | 0.0 | 0.0 | 0.0 | 810l |
| 0.0 | 1.0 | 0.0 | 0.0 | 810m |
| 0.0 | 0.7 | 0.3 | 0.0 | 810n |
| 0.0 | 0.0 | 1.0 | 0.0 | 810o |
| 0.3 | 0.7 | 0.0 | 0.0 | 810p |
| 1.0 | 0.0 | 0.0 | 0.0 | 810q |
| 0.8 | 0.2 | 0.0 | 0.0 | 810r |
| 0.3 | 0.7 | 0.0 | 0.0 | 810s |
| 0.0 | 0.8 | 0.2 | 0.0 | 810t |
| 0.8 | 0.2 | 0.0 | 0.0 | 810u |
| 0.7 | 0.3 | 0.0 | 0.0 | 810v |
| 0.0 | 0.2 | 0.8 | 0.0 | 810w |

| | | | | | |
|---|---|---|---|---|---|
| 710a | 3.0 | 0.0 | 0.0 | 0.0 | |
| 710b | 0.0 | 0.0 | 0.5 | 2.5 | |
| 710c | 0.2 | 2.5 | 0.3 | 0.0 | 715a |
| 710d | 2.7 | 0.3 | 0.0 | 0.0 | |
| 710e | 2.4 | 0.6 | 0.0 | 0.0 | |
| 710f | 0.0 | 0.0 | 1.0 | 2.0 | |
| 710g | 2.3 | 0.7 | 0.0 | 0.0 | |
| 710h | 2.0 | 1.0 | 0.0 | 0.0 | |
| 710i | 0.3 | 2.0 | 0.7 | 0.0 | |
| 710j | 0.0 | 3.0 | 0.0 | 0.0 | |
| 710k | 2.2 | 0.8 | 0.0 | 0.0 | |
| 710l | 0.1 | 2.9 | 0.0 | 0.0 | |
| 710m | 0.0 | 0.1 | 2.8 | 0.1 | 715b |
| 710n | 0.6 | 2.4 | 0.0 | 0.0 | |
| 710o | 0.0 | 2.8 | 0.2 | 0.0 | |
| 710p | 2.5 | 0.5 | 0.0 | 0.0 | |
| 710q | 1.0 | 2.0 | 0.0 | 0.0 | |
| 710r | 0.0 | 2.2 | 0.8 | 0.0 | |
| 710s | 0.0 | 1.5 | 1.5 | 0.0 | |
| 710t | 0.5 | 2.5 | 0.0 | 0.0 | 715c |
| 710u | 2.6 | 0.4 | 0.0 | 0.0 | |
| 710v | 2.6 | 0.4 | 0.0 | 0.0 | |
| 710w | 0.0 | 1.8 | 1.2 | 0.0 | |

| | | | | |
|---|---|---|---|---|
| 810a | 1.0 | 0.0 | 0.0 | 0.0 |
| 810b | 0.0 | 0.0 | 0.1 | 0.9 |
| 810c | 0.8 | 0.2 | 0.0 | 0.0 |
| 810d | 0.7 | 0.3 | 0.0 | 0.0 |
| 810e | 0.0 | 0.8 | 0.2 | 0.0 |
| 810f | 0.0 | 0.7 | 0.3 | 0.0 |
| 810g | 1.0 | 0.0 | 0.0 | 0.0 |
| 810h | 0.2 | 0.8 | 0.0 | 0.0 |
| 810i | 0.0 | 0.2 | 0.8 | 0.0 |
| 810j | 0.0 | 0.8 | 0.2 | 0.0 |
| 810k | 0.0 | 0.7 | 0.3 | 0.0 |
| 810l | 1.0 | 0.0 | 0.0 | 0.0 |
| 810m | 0.0 | 1.0 | 0.0 | 0.0 |
| 810n | 0.0 | 0.7 | 0.3 | 0.0 |
| 810o | 0.0 | 0.0 | 1.0 | 0.0 |
| 810p | 0.0 | 1.0 | 0.0 | 0.0 |
| 810q | 1.0 | 0.0 | 0.0 | 0.0 |
| 810r | 0.8 | 0.2 | 0.0 | 0.0 |
| 810s | 0.3 | 0.7 | 0.0 | 0.0 |
| 810t | 0.8 | 0.2 | 0.0 | 0.0 |
| 810u | 0.8 | 0.2 | 0.0 | 0.0 |
| 810v | 0.7 | 0.3 | 0.0 | 0.0 |
| 810w | 0.0 | 0.2 | 0.8 | 0.0 |

| | | | | | |
|---|---|---|---|---|---|
| 910a | 3.0 | 0.0 | 0.0 | 0.0 | |
| 910b | 0.0 | 0.0 | 0.5 | 2.5 | |
| 910c | 0.2 | 2.5 | 0.3 | 0.0 | 815a |
| 910d | 2.7 | 0.3 | 0.0 | 0.0 | |
| 910e | 3.4 | 0.6 | 0.0 | 0.0 | |
| 910f | 0.0 | 0.0 | 1.1 | 2.9 | |
| 910g | 3.1 | 0.9 | 0.0 | 0.0 | |
| 910h | 2.7 | 1.3 | 0.0 | 0.0 | |
| 910i | 0.3 | 2.8 | 0.9 | 0.0 | |
| 910j | 0.3 | 3.7 | 0.0 | 0.0 | |
| 910k | 3.2 | 0.8 | 0.0 | 0.0 | |
| 910l | 0.3 | 3.7 | 0.0 | 0.0 | |
| 910m | 0.0 | 0.3 | 3.6 | 0.1 | 815b |
| 910n | 0.6 | 3.2 | 0.2 | 0.0 | |
| 910o | 0.0 | 3.5 | 0.5 | 0.0 | |
| 910p | 3.5 | 0.5 | 0.0 | 0.0 | |
| 910q | 1.0 | 3.0 | 0.0 | 0.0 | |
| 910r | 0.0 | 2.9 | 1.1 | 0.0 | |
| 910s | 0.0 | 1.5 | 2.5 | 0.0 | |
| 910t | 0.8 | 3.2 | 0.0 | 0.0 | 815c |
| 910u | 3.6 | 0.4 | 0.0 | 0.0 | |
| 910v | 3.4 | 0.6 | 0.0 | 0.0 | |
| 910w | 0.3 | 2.5 | 1.2 | 0.0 | |
| 910x | 0.0 | 0.8 | 0.2 | 0.0 | |
| 910y | 0.8 | 0.2 | 0.0 | 0.0 | |
| 910z | 0.7 | 0.3 | 0.0 | 0.0 | |
| 910aa | 0.0 | 0.2 | 0.8 | 0.0 | |

| | C1 | C2 | C3 | C4 |
|---|---|---|---|---|
| 1310a | 3.0 | 0.0 | 0.0 | 0.0 |
| 1310b | 0.0 | 0.0 | 0.9 | 2.1 |
| 1310c | 2.8 | 0.2 | 0.0 | 0.0 |
| 1310d | 2.7 | 0.3 | 0.0 | 0.0 |
| 1310e | 0.0 | 2.8 | 0.2 | 0.0 |
| 1310f | 0.3 | 2.5 | 0.2 | 0.0 |
| 1310g | 3.0 | 0.0 | 0.0 | 0.0 |
| 1310h | 0.2 | 2.8 | 0.0 | 0.0 |
| 1310i | 0.0 | 0.2 | 2.0 | 0.8 |
| 1310j | 0.0 | 2.5 | 0.5 | 0.0 |
| 1310k | 0.0 | 2.7 | 0.3 | 0.0 |
| 1310l | 3.0 | 0.0 | 0.0 | 0.0 |
| 1310m | 1.0 | 2.0 | 0.0 | 0.0 |
| 1310n | 0.0 | 2.5 | 0.5 | 0.0 |
| 1310o | 0.0 | 0.0 | 3.0 | 0.0 |
| 1310p | 0.3 | 2.7 | 0.0 | 0.0 |
| 1310q | 3.0 | 0.0 | 0.0 | 0.0 |
| 1310r | 2.4 | 0.6 | 0.0 | 0.0 |
| 1310s | 0.3 | 2.4 | 0.3 | 0.0 |
| 1310t | 0.1 | 2.5 | 0.4 | 0.0 |
| 1310u | 2.8 | 0.2 | 0.0 | 0.0 |
| 1310v | 2.3 | 0.7 | 0.0 | 0.0 |
| 1310w | 0.3 | 0.4 | 2.3 | 0.0 |

| | | | | |
|---|---|---|---|---|
| 1210a | 3.0 | 0.0 | 0.0 | 0.0 |
| 1210b | 0.0 | 0.0 | 0.5 | 2.5 |
| 1210c | 0.2 | 2.5 | 0.3 | 0.0 |
| 1210d | 2.7 | 0.3 | 0.0 | 0.0 |
| 1210e | 2.4 | 0.6 | 0.0 | 0.0 |
| 1210f | 0.0 | 0.0 | 1.0 | 2.0 |
| 1210g | 2.3 | 0.7 | 0.0 | 0.0 |
| 1210h | 2.0 | 1.0 | 0.0 | 0.0 |
| 1210i | 0.3 | 2.0 | 0.7 | 0.0 |
| 1210j | 0.0 | 3.0 | 0.0 | 0.0 |
| 1210k | 2.2 | 0.8 | 0.0 | 0.0 |
| 1210l | 0.1 | 2.9 | 0.0 | 0.0 |
| 1210m | 0.0 | 0.1 | 2.8 | 0.1 |
| 1210n | 0.6 | 2.4 | 0.0 | 0.0 |
| 1210o | 0.0 | 2.8 | 0.2 | 0.0 |
| 1210p | 2.5 | 0.5 | 0.0 | 0.0 |
| 1210q | 1.0 | 2.0 | 0.0 | 0.0 |
| 1210r | 0.0 | 2.2 | 0.8 | 0.0 |
| 1210s | 0.0 | 1.5 | 1.5 | 0.0 |
| 1210t | 0.5 | 2.5 | 0.0 | 0.0 |
| 1210u | 2.6 | 0.4 | 0.0 | 0.0 |
| 1210v | 2.6 | 0.4 | 0.0 | 0.0 |
| 1210w | 0.0 | 1.8 | 1.2 | 0.0 |

1300

| | | | | |
|---|---|---|---|---|
| 1310a | 3.0 | 0.0 | 0.0 | 0.0 |
| 1310b | 0.0 | 0.0 | 0.9 | 2.1 |
| 1310c | 2.8 | 0.2 | 0.0 | 0.0 |
| 1310d | 2.7 | 0.3 | 0.0 | 0.0 |
| 1310e | 0.0 | 2.8 | 0.2 | 0.0 |
| 1310f | 0.3 | 2.5 | 0.2 | 0.0 |
| 1310g | 3.0 | 0.0 | 0.0 | 0.0 |
| 1310h | 0.2 | 2.8 | 0.0 | 0.0 |
| 1310i | 0.0 | 0.2 | 2.0 | 0.8 |
| 1310j | 0.0 | 2.5 | 0.5 | 0.0 |
| 1310k | 0.0 | 2.7 | 0.3 | 0.0 |
| 1310l | 3.0 | 0.0 | 0.0 | 0.0 |
| 1310m | 1.0 | 2.0 | 0.0 | 0.0 |
| 1310n | 0.0 | 2.5 | 0.5 | 0.0 |
| 1310o | 0.0 | 0.0 | 3.0 | 0.0 |
| 1310p | 0.3 | 2.7 | 0.0 | 0.0 |
| 1310q | 3.0 | 0.0 | 0.0 | 0.0 |
| 1310r | 2.4 | 0.6 | 0.0 | 0.0 |
| 1310s | 0.3 | 2.4 | 0.3 | 0.0 |
| 1310t | 0.1 | 2.5 | 0.4 | 0.0 |
| 1310u | 2.8 | 0.2 | 0.0 | 0.0 |
| 1310v | 2.3 | 0.7 | 0.0 | 0.0 |
| 1310w | 0.3 | 0.4 | 2.3 | 0.0 |

1400

| | | | | |
|---|---|---|---|---|
| 1410a | 3.0 | 0.0 | 0.0 | 0.0 |
| 1410b | 0.0 | 0.0 | 0.5 | 2.5 |
| 1410c | 0.2 | 2.5 | 0.3 | 0.0 |
| 1410d | 2.7 | 0.3 | 0.0 | 0.0 |
| 1410e | 5.4 | 0.6 | 0.0 | 0.0 |
| 1410f | 0.0 | 0.0 | 1.9 | 4.1 |
| 1410g | 5.1 | 0.5 | 0.9 | 0.0 |
| 1410h | 4.7 | 1.3 | 0.0 | 0.0 |
| 1410i | 0.3 | 4.8 | 0.9 | 0.0 |
| 1410j | 0.3 | 5.5 | 0.2 | 0.0 |
| 1410k | 5.2 | 0.8 | 0.0 | 0.0 |
| 1410l | 0.3 | 4.7 | 0.0 | 0.0 |
| 1410m | 0.0 | 0.3 | 4.8 | 0.9 |
| 1410n | 0.6 | 4.9 | 0.5 | 0.0 |
| 1410o | 0.6 | 4.5 | 0.5 | 0.0 |
| 1410p | 5.5 | 0.5 | 0.0 | 0.0 |
| 1410q | 2.0 | 4.0 | 0.0 | 0.0 |
| 1410r | 0.0 | 4.7 | 1.3 | 0.0 |
| 1410s | 0.0 | 1.5 | 4.5 | 0.0 |
| 1410t | 0.8 | 5.2 | 0.0 | 0.0 |
| 1410u | 5.6 | 0.4 | 0.0 | 0.0 |
| 1410v | 5.0 | 1.0 | 0.0 | 0.0 |
| 1410w | 0.3 | 4.2 | 1.5 | 0.0 |
| 1410x | 0.3 | 2.2 | 0.3 | 0.0 |
| 1410y | 0.3 | 2.4 | 0.3 | 0.0 |
| 1410z | 0.3 | 2.4 | 0.3 | 0.0 |
| 1410aa | 0.3 | 2.4 | 0.3 | 0.0 |

BARCODE DECODING

RELATED APPLICATIONS

U.S. Patent Application entitled "SYSTEMS AND METHODS FOR TRACKING OPTICAL CODES," naming inventors Ivan A. Bachelder and James A. Negro, filed on the same day as this patent application, is hereby incorporated herein by reference in its entirety.

TECHNOLOGICAL FIELD

The present technology relates generally to barcode decoding and, more specifically, to decoding a barcode based on multiple images of the barcode.

BACKGROUND

Barcodes are commonly used for marking items for identification. For example, barcodes are used for marking a product or part to permit identification of the product or part and retrieval of information about the product or part. As another example, barcodes can be used to mark packages to facilitate automated tracking and sorting of the packages during shipment. A barcode can identify a package, allowing for a tracking and sorting system to retrieve information about the package, such as the shipping address, destination address, etc., and use that information for routing the package.

There are several widely used barcode standards. A barcode standard provides a mapping between barcodes conforming to the standard and the data encoded by the barcodes. For example, some barcode standards (e.g., linear or one dimensional barcode standards) utilize a sequence of bars and spaces of various widths to encode data. Examples of such standards include Codabar, Code 39, and Code 128. Referring to Code 128 as an example, Code 128 uses a sequence of bars and spaces to encode numeric or alphanumeric characters. For example, a unique pattern of bars and spaces of particular widths encodes, e.g., the character 'A.' Similarly, other unique patterns of bars and spaces encode the remainder of the characters Code 128 can represent. A bar or space can be referred to as an element. In Code 128, an element can be 1, 2, 3, or 4 modules wide. The encoding for each character consists of six elements: three black bars and three white spaces. Encodings for multiple characters can be concatenated to form a barcode encoding a string of characters. Some barcode standards utilize 2 dimensional codes, e.g., consisting of a two dimensional array of white, black, and/or color blocks or shapes. Examples of such barcode standards include Code 1 and QR Code. More generally, a barcode can be a machine-readable set of elements that encode data.

Barcodes can be read by barcode readers. Barcode readers can utilize, for example, lasers, line scan cameras, and/or area scan cameras to capture images of barcodes. The barcode reader can then analyze the elements in the barcode and convert the elements into the represented data using the mapping provided by the barcode standard. This process can be referred to as decoding. In some instances, barcode readers can capture a portion of the barcode in a given image. For example, in an application where a barcode reader reads barcodes on packages moving past the scanner on a conveyor belt, the barcode scanner might capture only a portion of a particular barcode in a single image. If only a portion of the barcode appears in the image, the barcode reader might not be able to decode the entire barcode.

SUMMARY OF THE TECHNOLOGY

Accordingly, there is a need for barcode reading technology that can utilize multiple images, each containing at least a portion of a barcode, to decode the barcode. The technology disclosed herein can facilitate reading a barcode based on multiple partial images of the barcode by combining or stitching together the barcode data extracted from the partial images. Beneficially, the technology can be used in applications where barcode readers might not capture images of the complete barcode, such as when the barcodes are in motion relative to the barcode reader.

In one aspect, there is a barcode reading system for decoding at least a portion of a barcode. The barcode reading system includes a barcode scanner. The barcode reading system includes a signal processor connected to the barcode scanner. The signal processor is configured to store first integrated sub-character barcode feature evidence for the barcode, the first integrated sub-character barcode feature evidence including evidence for a first plurality of possible sub-character barcode feature interpretations for a first plurality of sub-character barcode features of the barcode. The signal processor is configured to acquire, from the barcode scanner, a first scan signal for at least a first portion of the barcode. The signal processor is configured to extract, from the first scan signal, sub-character barcode feature measurements for a second plurality of sub-character barcode features. The signal processor is configured to determine first sub-character barcode feature evidence for the second plurality of sub-character barcode features based on the sub-character barcode feature measurements for the second plurality of sub-character barcode features, the first sub-character barcode feature evidence including evidence for a second plurality of possible sub-character barcode feature interpretations for the second plurality of sub-character barcode features. The signal processor is configured to determine whether a first portion of the first integrated sub-character barcode feature evidence corresponds to a second portion of the first sub-character barcode feature evidence. The signal processor is configured to integrate the first sub-character barcode feature evidence into the first integrated sub-character barcode feature evidence if the first portion of the first integrated sub-character barcode feature evidence corresponds to the second portion of the integrated sub-character barcode feature evidence. The signal processor is configured to determine one or more character values from the first integrated sub-character barcode feature evidence.

In some embodiments, the first integrated sub-character barcode feature evidence is first integrated element evidence, the first integrated element evidence including evidence for a first plurality of possible element interpretations for a first plurality of elements. In some embodiments, the first integrated sub-character barcode feature evidence is first integrated edge-to-similar-edge feature evidence, the first integrated edge-to-similar-edge feature evidence including evidence for a first plurality of possible edge-to-similar-edge feature interpretations for a first plurality of edge-to-similar-edge features. In some embodiments, the first integrated sub-character barcode feature evidence is first integrated module location evidence, the first integrated module location evidence including evidence for a first plurality of possible module location interpretations for a first plurality of module locations. In some embodiments, the first integrated sub-character barcode feature evidence is first integrated character evidence, the first integrated character evidence including evidence for a first plurality of possible element interpretations for a first plurality of elements associated with a character of the barcode.

In some embodiments, the barcode scanner is a camera. In some embodiments, the barcode scanner is a laser scanner. In some embodiments, the signal processor is configured to determine the first sub-character barcode feature evidence for the second plurality of sub-character barcode features based on the sub-character barcode feature measurements for the second plurality of sub-character barcode feature by applying one or more evidence functions to each of the sub-character barcode feature measurements. In some embodiments, the signal processor is configured to determine whether a first portion of the first integrated sub-character barcode feature evidence corresponds to a second portion of the first sub-character barcode feature evidence by calculating a correlation between the first integrated sub-character barcode feature evidence and the first sub-character barcode feature evidence. In some embodiments, the first plurality of possible sub-character barcode feature interpretations for a first plurality of sub-character barcode features of the barcode includes all possible sub-character barcode feature interpretations for the first plurality of sub-character barcode features.

In another aspect, there is a method performed by a barcode reading system for decoding at least a portion of a barcode. The method includes storing, by the barcode reading system, first integrated sub-character barcode feature evidence for the barcode, the first integrated sub-character barcode feature evidence including evidence for a first plurality of possible sub-character barcode feature interpretations for a first plurality of sub-character barcode features of the barcode. The method includes acquiring, by the barcode reading system, from a barcode scanner, a first scan signal for at least a first portion of the barcode. The method includes extracting, by the barcode reading system, from the first scan signal, sub-character barcode feature measurements for a second plurality of sub-character barcode features. The method includes determining, by the barcode reading system, first sub-character barcode feature evidence for the second plurality of sub-character barcode features based on the sub-character barcode feature measurements for the second plurality of sub-character barcode features, the first sub-character barcode feature evidence including evidence for a second plurality of possible sub-character barcode feature interpretations for the second plurality of sub-character barcode features. The method includes determining, by the barcode reading system, whether a first portion of the first integrated sub-character barcode feature evidence corresponds to a second portion of the first sub-character barcode feature evidence. The method includes integrating, by the barcode reading system, the first sub-character barcode feature evidence into the first integrated sub-character barcode feature evidence if the first portion of the first integrated sub-character barcode feature evidence corresponds to the second portion of the integrated sub-character barcode feature evidence. The method includes determining, by the barcode reading system, one or more character values from the first integrated sub-character barcode feature evidence.

In some embodiments, the first integrated sub-character barcode feature evidence is first integrated element evidence, the first integrated element evidence including evidence for a first plurality of possible element interpretations for a first plurality of elements. In some embodiments, the first integrated sub-character barcode feature evidence is first integrated edge-to-similar-edge feature evidence, the first integrated edge-to-similar-edge feature evidence including evidence for a first plurality of possible edge-to-similar-edge feature interpretations for a first plurality of edge-to-similar-edge features. In some embodiments, the first integrated sub-character barcode feature evidence is first integrated module location evidence, the first integrated module location evidence including evidence for a first plurality of possible module location interpretations for a first plurality of module locations. In some embodiments, the first integrated sub-character barcode feature evidence is first integrated character evidence, the first integrated character evidence including evidence for a first plurality of possible element interpretations for a first plurality of elements associated with a character of the barcode.

In some embodiments, the barcode scanner is a camera. In some embodiments, the barcode scanner is a laser scanner. In some embodiments, the method includes applying, by the barcode reading system, one or more evidence functions to each of the sub-character barcode feature measurements. In some embodiments, the method includes calculating a correlation between the first integrated sub-character barcode feature evidence and the first sub-character barcode feature evidence. In some embodiments, the first plurality of possible sub-character barcode feature interpretations for a first plurality of sub-character barcode features of the barcode includes all possible sub-character barcode feature interpretations for the first plurality of sub-character barcode features.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 6 illustrates exemplary element evidence for elements after the element evidence has been extracted for a scan line.

FIGS. 7A-7C illustrate integrated character evidence.

FIG. 8 illustrates exemplary element evidence for elements after the element evidence has been extracted for a scan line.

FIG. 9 illustrates the correspondence between integrated character evidence and character evidence.

FIGS. 12A-12C illustrate element evidence for elements after the element evidence has been extracted and integrated for scan lines.

FIG. 13 illustrates the integrated element evidence for elements after the element evidence for three scan lines has been extracted and integrated.

FIG. 14 illustrates integrated element evidence from partial barcodes.

DETAILED DESCRIPTION

Figure 1:
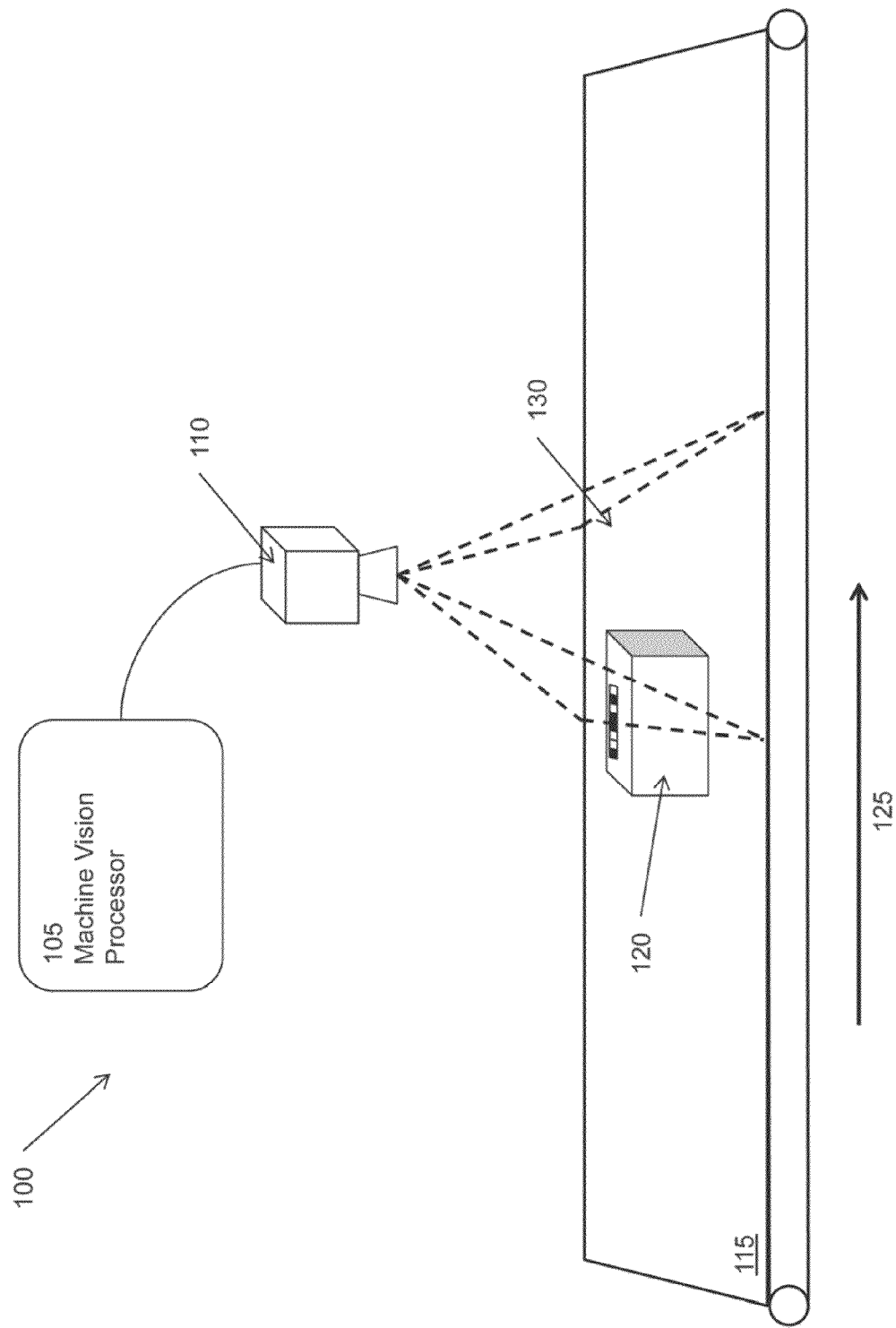
FIG. 1 depicts a machine vision system.

The technology can read a barcode based on multiple partial images of the barcode by combining the evidence of the barcode extracted from the multiple partial images. For example, if a first image captures the first ⅔ of a barcode and a second image captures the last ⅔ of a barcode, the technology can facilitate combining the evidence of the barcode from the two images such that the entire barcode can be decoded.

In some embodiments, the technology can comprise a machine vision system for reading barcodes. As an example of the system in operation, the system can capture with a camera a first image of a first portion of the barcode (e.g., the first ⅔ of the barcode) and a second image of a second portion of the barcode (e.g., the last ⅔ of the barcode). The system can analyze the first portion of the barcode to determine information about the character elements that are present in the first portion of the barcode. For example, for a linear barcode, the system can scan in a line across the first portion of the barcode to determine information about the sequence of elements (e.g., bars and spaces) and each element's respective width (e.g., its width in element modules). In many common applications, the image of the portion of the barcode can be blurry due to a variety of factors (e.g., motion of the code relative to the camera, pixilation, camera artifacts, barcode printing errors, etc.). As a result, a particular element may not appear to be an exact integer number of element modules wide, making interpreting that element based on a single scan difficult. To address this, in part, the technology can collect evidence of each element's width, where the evidence can be apportioned between multiple possible interpretations of the element's width. For example, a given element can appear to be midway between two modules wide and three modules wide. In such a case, the technology can apportion equal evidence to an interpretation of that element as two modules wide and an interpretation of that element as three modules wide.

The system can perform multiple scans of the first portion of the barcode to collect further evidence of the possible interpretations of each element, and integrate the evidence from all the scans to form integrated evidence of each element's possible interpretation. For example, after multiple scans, there can be some evidence indicating a particular element is two modules wide, some evidence indicating it is three modules wide, and some evidence indicating it is four modules wide. As another example, substantially all of the evidence for another element can indicate it is one module wide. The system can similarly collect evidence for each possible interpretation of each element in the second portion of the barcode from the second image by performing multiple scans and integrating the evidence.

In some embodiments, the system can combine the evidence from the first portion of the barcode from the first image and the second portion of the barcode from the second image. The system can determine if the first portion of the barcode and the second portion overlap. In the example discussed above, the first portion of the barcode and the second portion of the barcode would overlap because they both include the middle ⅓ of the barcode. The system can determine if the first portion of the barcode and second portion overlap by comparing the evidence of the elements' possible interpretations to look for matching sequences of elements and/or groups of elements forming characters in both portions of the barcode. Beneficially, the technology permits performing this comparison between the barcode portions on the basis of the integrated evidence of each element's possible interpretations, rather than a potentially incorrect single interpretation of an element's width (or a potentially incorrect interpretation of a collection of elements as a particular character).

Generally, the technology can be used to collect integrated evidence of a plurality of possible interpretations of any sub-character barcode features. For example, evidence can be collected and integrated for all possible interpretations (or a subset thereof) of a barcode element in a multi-width standard. For each element, evidence for an interpretation of each possible width can be collected and integrated. As another example, evidence can be collected and integrated for all possible interpretations of a barcode element in a two-width barcode standard. For each element, evidence for an interpretation of wide and an interpretation of narrow can be collected and integrated. As another example, evidence for each possible edge-to-similar-edge distance can be collected and integrated. In the case of Code 128, for example, since each character consists of three bars and three spaces, and each element can be one, two, three, or four elements wide, evidence for each of the following interpretations can be collected and integrated for each edge-to-similar-edge measurement: an interpretation of two, three, four, five, six, seven, or eight modules wide. As still another example, evidence of whether each module location is part of a bar or space can be collected and integrated. For example, evidence can be apportioned to the possible interpretations for that module based on where the signal for the module location falls within the reflectance range of the barcode.

The technology can be employed in a variety of applications. FIG. 1 depicts machine vision system 100. Machine vision system 100 includes machine vision processor 105. Machine vision processor 105 can be a computing device configured in accordance with the technology. Machine vision processor 105 is connected to camera 110 such that, for example, machine vision processor can receive image data for images captured by camera 110. Machine vision system 100 includes conveyor belt 115. In operation, an object bearing a barcode, such as package 120, can be placed on conveyor belt 115. Conveyor belt 115 can convey package 120 in the direction of arrow 125 through field of view 130 of camera 110. As package 120 passes through field of view 130, camera 110 can capture a plurality of images of package 120 and its barcode. As illustrated, the barcode on package 120 can be partially in field of view 130, resulting in only a portion of the barcode appearing in an image captured by camera 110. In accordance with the technology, machine vision processor 105 can use evidence collected from multiple partial images of the barcode on package 120 to decode the full barcode. It should be appreciated that other machine vision systems are envisioned in accordance with the technology. For example, the technology can be embodied in handheld barcode readers, machine vision cameras with integrated machine vision processors, etc.

Figure 2:
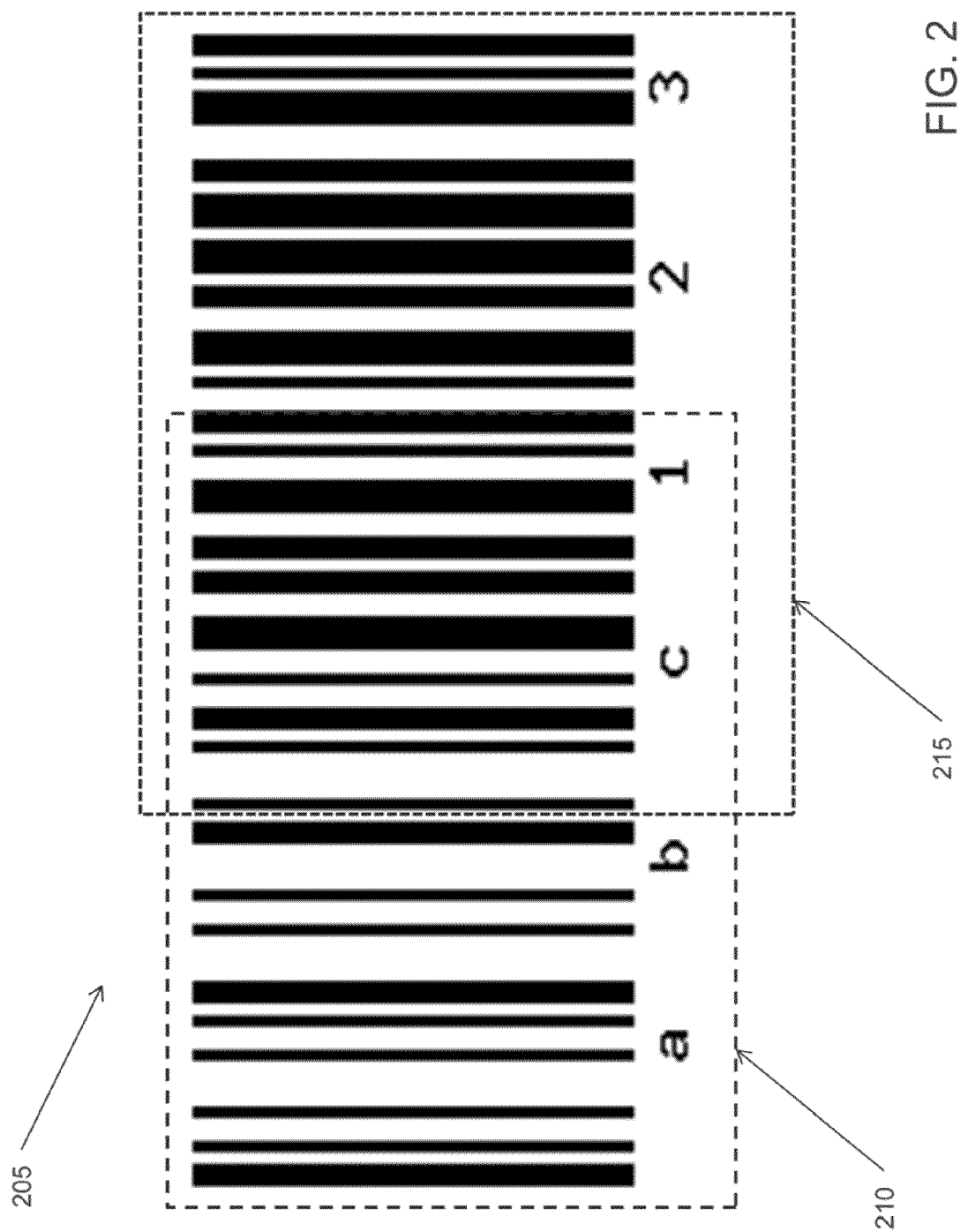
FIG. 2 depicts a complete barcode.
Figure 3:
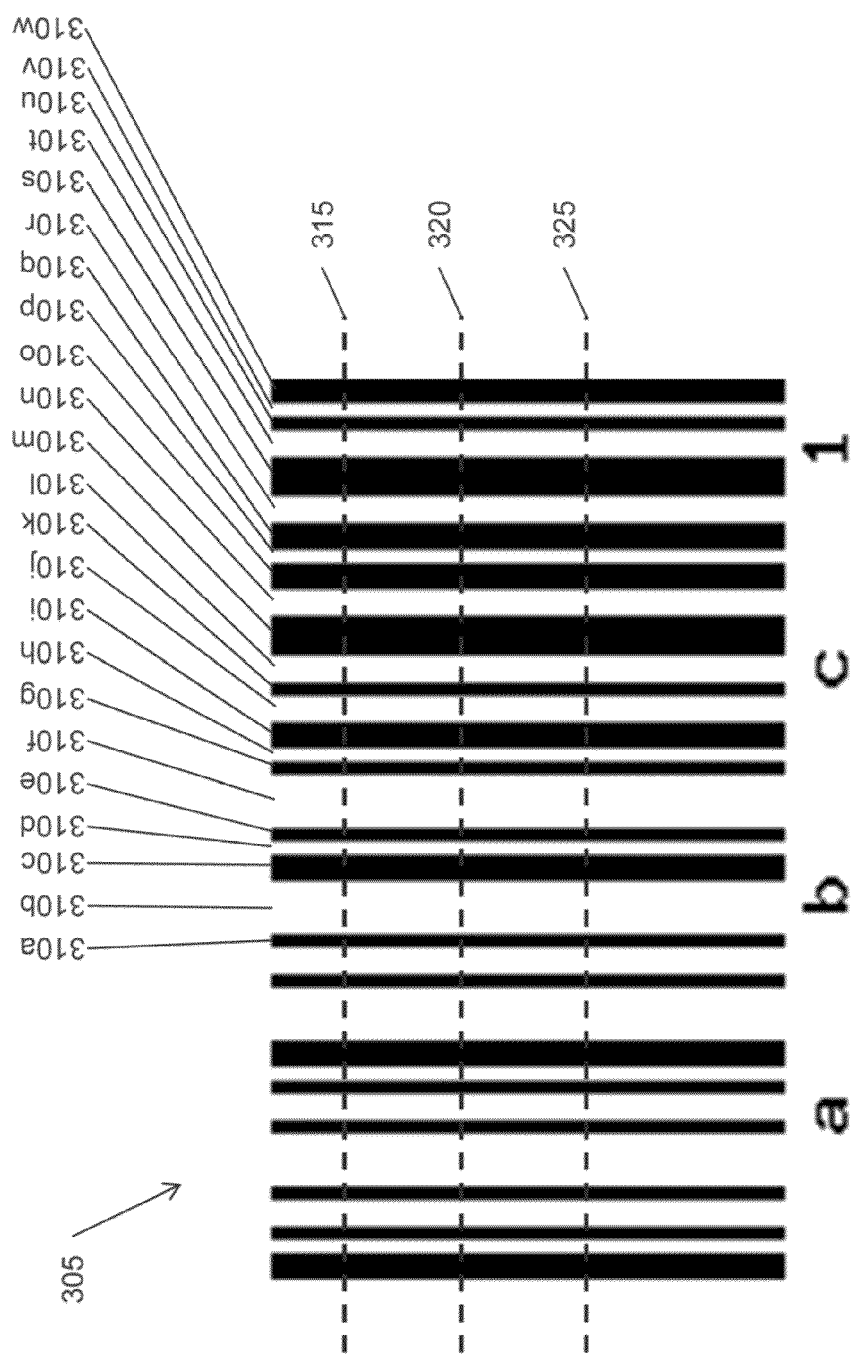
FIG. 3 depicts a partial barcode.
Figure 4:
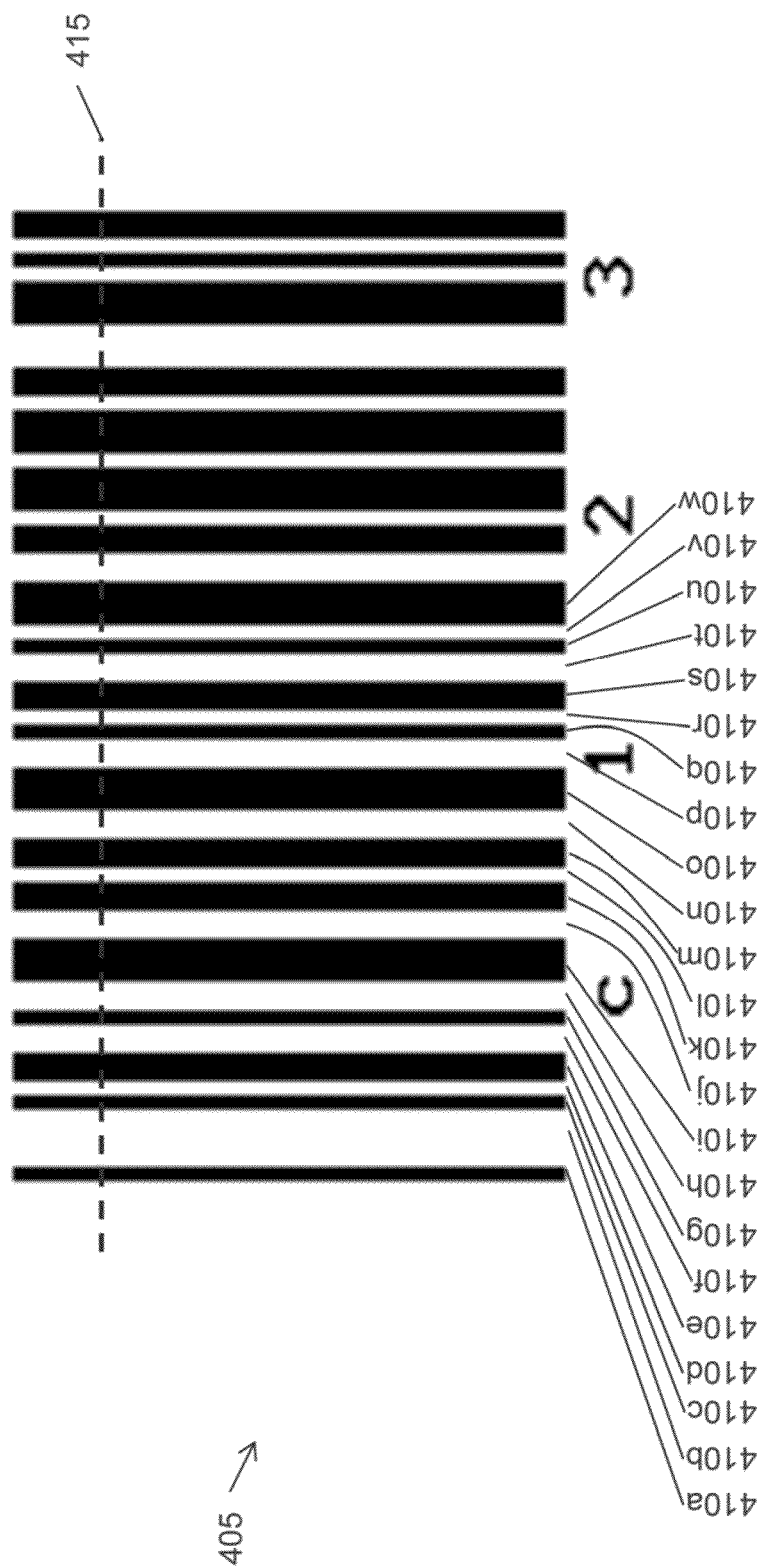
FIG. 4 depicts a partial barcode.

FIG. 2 depicts complete barcode 205. Complete barcode 205 is a complete barcode conforming to the Code 128 standard. Barcode 205 encodes the character string "abc123," and includes additional information required by the Code 128 standard. FIG. 3 depicts partial barcode 305. Partial barcode 305 is a first portion of complete barcode 205. Box 210 of FIG. 2 shows the portion of complete barcode 205 corresponding to partial barcode 305. Partial barcode 305 is made up of a plurality of elements (e.g., elements 310a-310w). Each element in partial barcode 305 is either a bar or a space with a width 1-4 times the module width. FIG. 4 depicts partial barcode 405. Partial barcode 405 is a second portion of complete barcode 205. Box 215 of FIG. 2 shows the portion of complete barcode 205 corresponding to partial barcode 405. Partial barcode 405 is made up of a plurality of elements (e.g., elements 410a-410w). Each element in partial barcode 405 is either a bar or a space with a width 1-4 times the module width.

Figure 5:
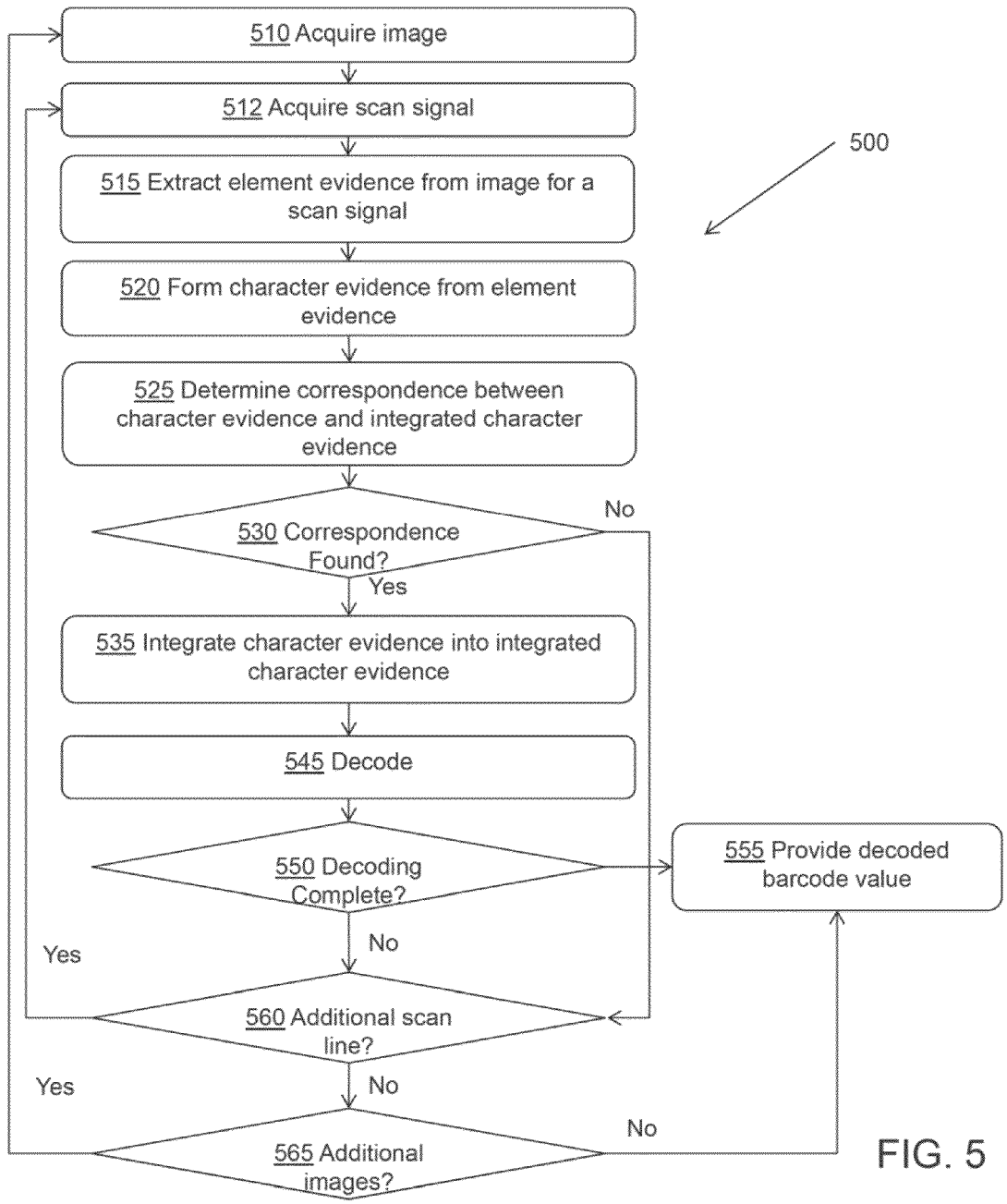
FIG. 5 depicts a flowchart illustrating a method of decoding according to an embodiment of the technology.

FIG. 5 depicts flowchart 500 illustrating a method of decoding according to an embodiment of the technology. At step 510, an image of a barcode is acquired. For example, an image depicting partial barcode 305 can be acquired. At step 512, a scan signal is acquired from the image. For example, the techniques for extracting a scan signal described in U.S.

Patent Publication US2013/0163876, titled "Methods and Apparatus for One-Dimensional Signal Extraction" and filed Dec. 23, 2011, the contents of which are hereby incorporated by reference, can be used for extracting the scan signal from the image. With respect to partial barcode 305, a scan along scan line 315 can be performed to acquire a scan signal for scan line 315.

At step 515, element evidence is extracted from the scan signal. Element evidence can be, e.g., a set of numbers indicating an amount of evidence in favor of one or more possible interpretation of an element. For example, element evidence can be extracted for each element in partial barcode 305. In the case of partial barcode 305, each element can be interpreted as one, two, three, or four modules wide.

The elements' widths in modules (e.g., the width of the element in a multiple of the module width) can be determined by analyzing the scan signal. Conventional techniques known to those of skill in the art can be used to identify the edges of the bars and spaces (e.g., the elements) and their respective widths. Various techniques can be used to determine the widths of the elements in modules. The module width can be estimated based on the start or stop character. In some embodiments, the technology can include grouping the elements by character. For example, in Code 128, a character (excluding the stop character) is composed of three bars and three spaces. The technology can search for either a start character or a stop character in the image, and then associate groups of elements with character positions in the barcode (e.g., without assigning a final character value to the group of character elements).

In some embodiments, print growth can be accounted for when determining the widths of the elements in modules. Print growth can refer to the expansion or contraction of the bars due to how the barcode is printed or formed. Techniques known in the art can be employed to estimate print growth. In some approaches, the technology can estimate print growth by measuring the distance between edge and similar edge (e.g., the distance between the beginning of a bar and the beginning of the next bar and/or the distance between the beginning of a space and the beginning of the next space) as well as the width of each module. The technology can attempt to decode the groups of elements based on these measurements, selecting a print growth factor that results in the most successful decoding of the most characters (e.g., the most characters conform to the standard). The measurements of the elements can then be adjusted by the estimated print growth factor (e.g., by subtracting the print growth factor from the measurements of the bars and adding the print growth to the measurements of the spaces).

As noted above, various factors can affect the visibility of character elements in the image. In some cases, one or more elements might not be visible. For example, one of the bars might not be visible due to lighting, such that it appears that the bar is a part of its adjacent spaces. The technology can account for this by calculating an estimated width for each character, e.g., based on the edge-to-edge elements. Characters for which it appears elements are missing can be excluded when collecting element evidence. Beneficially, the technology can then determine where the next character should begin without relying solely on counting bars and spaces to find the boundaries of each character.

The width of each element (e.g., adjusted as described above) can be divided by the module width to determine the width of the element in modules. This calculation can account for print growth and non-visible elements as described above. In some instances an element may not be an integer number of modules wide. For example, the measured width of an element can be between two and three modules wide. In some embodiments, evidence can be apportioned between the possible interpretations of the element. For example, in some embodiments, a total of 1.0 units of evidence can be apportioned between the possible interpretations of the element. Various approaches of apportioning evidence between possible interpretations are contemplated. For example, in the case of Code 128, each element can be one, two, three, or four modules wide. An evidence function can be defined for each possible interpretation. As an example, the following piece-wise evidence function can provide the evidence (E) for each possible interpretation within a multi-width barcode:

$$E=0, \text{ if } |W-I|>=1-T$$

$$E=1, \text{ if } |W-I|<=T$$

$$E=1-|W-I|-T/I-2T, \text{ if } T<|W-I|<1-T$$

Where:
  W is the measured width of the element in modules;
  I is the integer number of module widths for the interpretation; and
  T is the tolerance required by the barcode specification (e.g., 0.1 if the standard requires a 10% tolerance per element).

The exemplary piece-wise function can be evaluated for each possible interpretation of the element. For example, in the case of Code 128, the evidence function can be evaluated for the interpretation of the element as one module wide (e.g., I=1), two modules wide (e.g., I=2), three modules wide (e.g., I=3), and four modules wide (e.g., I=4). As another example, the following piece-wise evidence function can provide the evidence (E) for each possible interpretation for a two-width barcode:

$$E=0, \text{ if } |W-I|>=(N-1)-T$$

$$E=1, \text{ if } |W-I|<=T$$

$$E=1-|W-I|-T/(N-1)-2T, \text{ if } T<|W-I|<(N-1)-T$$

Where:
  W is the measured width of the element in modules;
  I is the fractional number of module widths for the interpretation;
  N is the wide-to-narrow element ratio, and
  T is the tolerance required by the barcode specification (e.g., 0.1 if the standard requires a 10% tolerance per element).

The exemplary piece-wise function can be evaluated for each possible interpretation of the element. For example, in the case of Code 39, the evidence function can be evaluated for the interpretation of the element as a narrow element (e.g., I=1), and a wide element (e.g., I=N). Other evidence functions are anticipated. For example, the apportionment between two interpretations is not required to be linear.

FIG. 6 illustrates exemplary element evidence 610a-610w for elements 310a-310w after the element evidence has been extracted for scan line 315. The four numbers shown for each element indicate the amount of evidence for interpreting the element as one module wide, two modules wide, three modules wide, and four modules wide. For example, element evidence 610a for element 310a shows 1.0 units of evidence for interpreting element 310a as one module wide (e.g., indicating the module 310a was measured at nearly exactly one module wide). Element evidence 610b for element 310b shows 0.5 units of evidence for interpreting element 310b as 3 modules wide and 0.5 units of evidence for interpreting element 310b as 4 modules wide (e.g., indicating that module 310*b* was measured at approximately 3.5 modules wide along scan line 315). Similar element evidence can be collected for each other element in the image.

At step 520, character evidence is formed from the element evidence. For example, the element evidence can be grouped by character position based on the determinations described above. With reference to FIG. 6, element evidence 610*e* (corresponding to element 310*e*), element evidence 610*f* (corresponding to element 310*f*), element evidence 610*g* (corresponding to element 310*g*), element evidence 610*h* (corresponding to element 310*h*), element evidence 610*i* (corresponding to element 310*i*), and element evidence 610*j* (corresponding to element 310*j*) form character evidence 615*a*, representing the character at the third position in partial barcode 305. Element evidence 610*k*-610*p* (corresponding to elements 310*k*-310*p*) form character evidence 615*b*, forming the character at the fourth character position in partial barcode 305. Element evidence 610*q*-610*v* (corresponding to elements 310*q*-310*v*) form character evidence 615*c*, forming the character at the fourth character position in partial barcode 305. Character evidence can be formed for the remaining characters in partial barcode 305 in a similar manner.

Figures 7A, 7B, 7C:
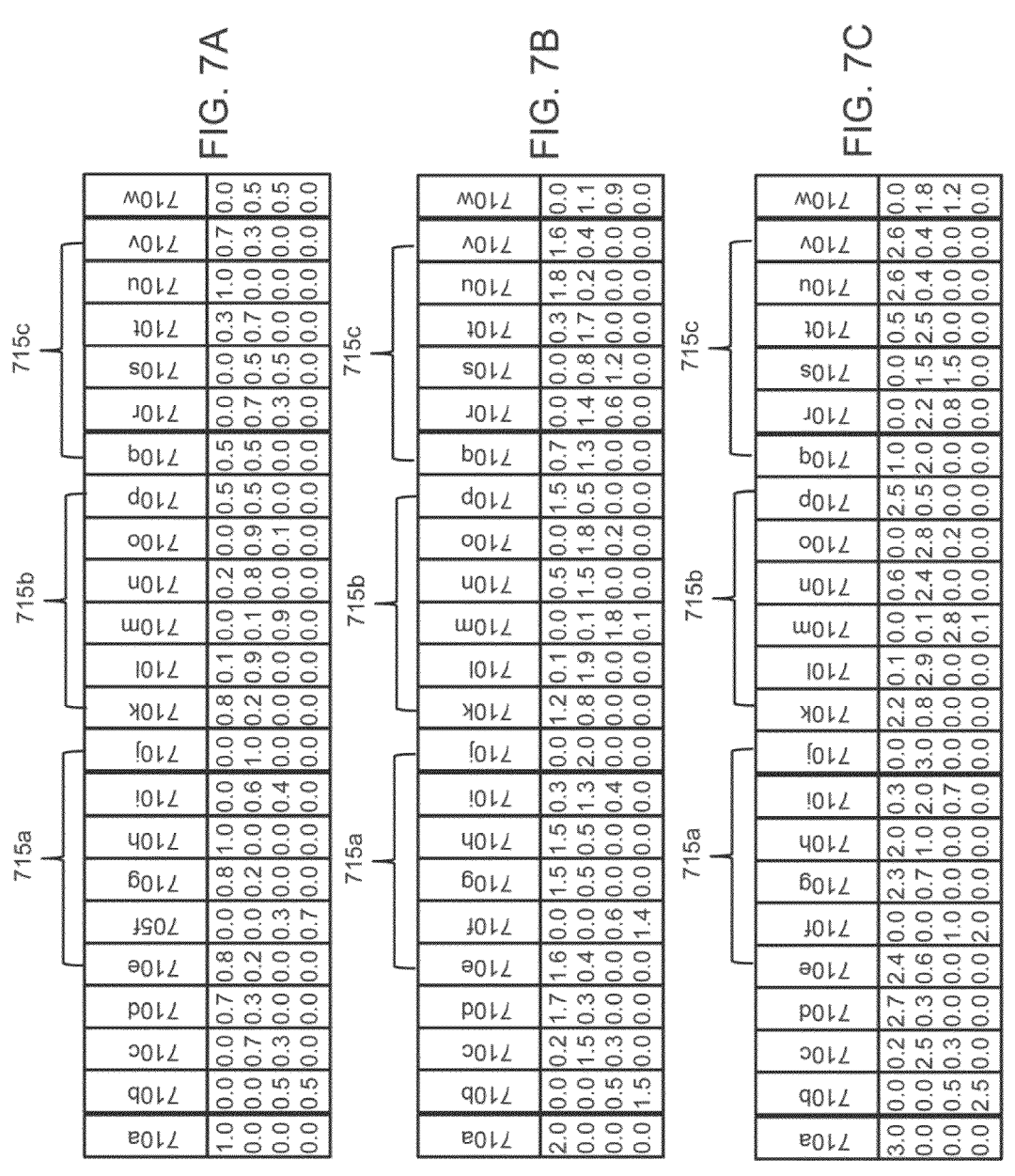

At step 525, it is determined whether a correspondence exists between the character evidence and the integrated character evidence. In the illustrated example, character evidence 615*a*-615*c* is the first character evidence extracted. Accordingly, there is no stored integrated evidence with which to determine a correspondence. At step 530, the method proceeds to step 535 as if a correspondence is found. FIGS. 7A-7C illustrate integrated character evidence 715*a*-715*c*. At step 535, character evidence 615*a*-615*c* can be stored as the integrated character evidence 715*a*-715*c*, as illustrated in FIG. 7A. At step 545, the technology can decode the barcode based on the integrated character evidence, using, for each element, the element interpretation with the greatest evidence. In some embodiments, decoding can be unsuccessful if character evidence has not been collected for the entire barcode. In some embodiments, the technology can calculate a confidence score based on the element evidence. The technology can, for each element, subtract the evidence for the interpretation with the second most evidence from the interpretation with the most evidence to determine the confidence score for the element. For example, if an element has 2.4 units of evidence for an interpretation of that element as two modules wide and 0.9 units of evidence for an interpretation of that element as one module wide, the confidence metric for that element can be 1.5. In some embodiments, the confidence score for a barcode is equal to the confidence for the element of the barcode with the lowest confidence score. In some embodiments, when character evidence for each character in the barcode has been collected, decoding can fail when the confidence score for the barcode is less than a pre-determined threshold (e.g., a threshold of 1.5). In the illustrated instance, decoding can fail because character evidence has been collected for only a portion of complete barcode 205.

At step 550, the method proceeds to step 560 because decoding was not completed. At step 560, it is determined whether there are additional lines to scan in the current image. With respect to partial barcode 305, scan lines 320 and 325 remain. If there are additional scan lines, at step 560 the method can proceed to step 512. At step 512, a scan signal is acquired from the image. For example, with respect to partial barcode 305, a scan signal for scan line 320 can be acquired as described above. At step 515, element evidence is extracted from the scan signal. For example, with respect to partial barcode 305, element evidence can be extracted from the scan signal for scan line 320 as described above.

At step 520, character evidence is formed from the element evidence. For example, the element evidence from the scan along scan line 320 can be grouped by character position based on the determinations described above. At step 525, it is determined whether a correspondence exists between the character evidence and integrated character evidence. In the illustrated example, the characters evidence from the scan along scan line 320 corresponds to integrated character evidence 715*a*-715*c* due to the evidence being extracted from the same image. In some embodiments, the normalized correlation can be calculated for the character evidence and integrated character evidence to determine the correspondence, as described below. At step 530, the method proceeds to step 535 due to the correspondence found. At step 535, the character evidence is integrated into the integrated character evidence. In some embodiments, integration can include adding the evidence of possible interpretations for each element. FIG. 7B illustrates integrated character evidence 715*a*-715*c* after the element evidence for scan line 320 has been integrated. As illustrated, each element has a total of 2.0 units of evidence spread across one or more possible interpretations for the element.

In some embodiments, the element evidence from a scan line can be weighted to increase or decrease its effect on the integrated character evidence. For example, a scan quality factor can be calculated. In some embodiments, the difference between the amount of evidence for the interpretation with the greatest amount of evidence and the interpretation with the next greatest amount of evidence is determined for each element. The scan quality factor can vary inversely to the greatest of those differences (e.g., to provide greater weight for evidence from scans where the evidence for each element is substantially for a single interpretation).

At step 545, the technology can decode the barcode based on the integrated evidence, using, for each element, the element interpretation with the greatest evidence in the integrated character evidence. In the illustrated instance, decoding can fail because character evidence has been collected for only a portion of complete barcode 205. At step 550, the method proceeds to step 560 because decoding was not completed. At step 560, it is determined whether there are additional lines to scan in the current image. With respect to partial barcode 305, scan line 325 remains. If there are additional scan lines, the method can proceed to step 512. Steps 512 through 530 can be performed for scan line 325. At step 535, the character evidence is integrated into the integrated character evidence. FIG. 7C illustrates integrated character evidence 715*a*-715*c* after the element evidence for scan line 325 has been integrated. As illustrated, each element has a total of 3.0 units of evidence spread across one or more possible interpretations for the element.

At step 545, the technology can decode the barcode based on the integrated evidence, using, for each element, the element interpretation with the greatest evidence in the integrated evidence. In the illustrated instance, decoding can fail because character evidence has been collected for only a portion of complete barcode 205. At step 550, the method proceeds to step 560 because decoding was not completed. At step 560, it is determined whether there are additional lines to scan in the current image. With respect to partial barcode 305, no scan lines remain. If there are no additional scan lines, the method can proceed to step 510.

At step 510, an image of a barcode is acquired. For example, an image depicting partial barcode 405 can be acquired. At step 512, a scan signal is acquired from the image. For example, with respect to partial barcode 405, a scan along scan line 415 can be performed to acquire a scan signal for scan line 415. At step 515, element evidence is extracted from the scan signal. For example, with respect to partial barcode 405, element evidence can be extracted for each element in partial barcode 405, as described above. FIG. 8 illustrates exemplary element evidence 810*a*-810*w* for elements 410*a*-410*w* after the element evidence has been extracted for scan line 415. At step 520, character evidence is formed from the element evidence. For example, the element evidence can be grouped by character position based on the determinations described above. With reference to FIG. 8, element evidence 810*a*-810*f* (corresponding to elements 410*a*-410*f*) form character evidence 815*a*, representing the character at the first position in partial barcode 405. Element evidence 810*g*-810*l* (corresponding to elements 410*g*-410*l*) form character evidence 815*b*, forming the character at the second character position in partial barcode 405. Element evidence 810*m*-810*r* (corresponding to elements 410*q*-410*r*) form character evidence 815*c*, forming the character at the third character position in partial barcode 405. Character evidence can be formed for the remaining characters in partial barcode 405 in a similar manner.

At step 525, it is determined whether a correspondence exists between the character evidence and integrated character evidence. For example, the character evidence can be compared to the integrated evidence at various positions to find corresponding portions (e.g., suggesting overlap between the partial barcodes). In the illustrated example, character evidence 815*a*-815*c* can be compared to integrated character evidence 715*a*-715*c* of FIG. 7C to determine if there is a correspondence. For example, the following possible correspondences can be considered: 1) character evidence 815*a* corresponding to integrated character evidence 715*c*; 2) character evidence 815*a* and 815*b* corresponding to integrated character evidence 715*b* and 715*c*, respectively; and 3) character evidence 815*a*, 815*b*, and 815*c* corresponding to integrated character evidence 715*a*, 715*b*, and 715*c*, respectively. In some embodiments, a potential correspondence can be evaluated by calculating a normalized correlation between the integrated character evidence and the potentially corresponding character evidence, for each potentially corresponding character. The potential correspondence with the greatest aggregate normalized correlation across all characters, and that exceeds a pre-determined threshold, can be considered the correct correspondence. FIG. 9 illustrates the correspondence between integrated character evidence 715*a*-715*c* and character evidence 815*a*-815*c*. As illustrated, character evidence 815*a*, 815*b*, and 815*c* correspond to integrated character evidence 715*a*, 715*b*, and 715*c*, respectively (indicating that the associated portions of partial barcode 305 and partial barcode 405 overlap). At step 530, the method proceeds to step 535 because a correspondence is found. At step 535, the character evidence is integrated into the integrated character evidence. For example, as illustrated in FIG. 9, character evidence 815*a*, 815*b*, and 815*c* is added to integrated character evidence 715*a*, 715*b*, and 715*c*. In some embodiments, the element evidence not associated with a character can be appended to the integrated character evidence. In some embodiments, the element evidence not associated with the character can be discarded. The method can proceed to step 545.

At step 530, if no correspondence is found, the method proceeds to step 560. In some embodiments, integrated character evidence can be stored for multiple barcodes. The character evidence can be compared to the integrated character evidence for one or more barcodes (e.g., in sequence and/or in parallel), and, if a correspondence is found for a barcode, the character evidence can be integrated into the integrated evidence for that barcode. In some embodiments, if the character evidence does not correspond to any integrated evidence for any barcode, the character evidence can be treated as associated with a new barcode.

At step 545, the technology can decode the barcode based on the integrated character evidence, using, for each element, the element interpretation with the greatest evidence. In the illustrated instance, decoding can succeed because character evidence has been collected for complete barcode 205. At step 550, the method proceeds to step 555, where the decoded barcode can be provided.

If it is determined that the barcode is not decoded, the method can proceed as described above to extract additional evidence from additional scan lines from additional images. If it is determined at step 560 that there are no additional scan lines and at step 565 that there are no additional images of the barcode, a partially decoded barcode can be provided at step 555.

Figure 10:
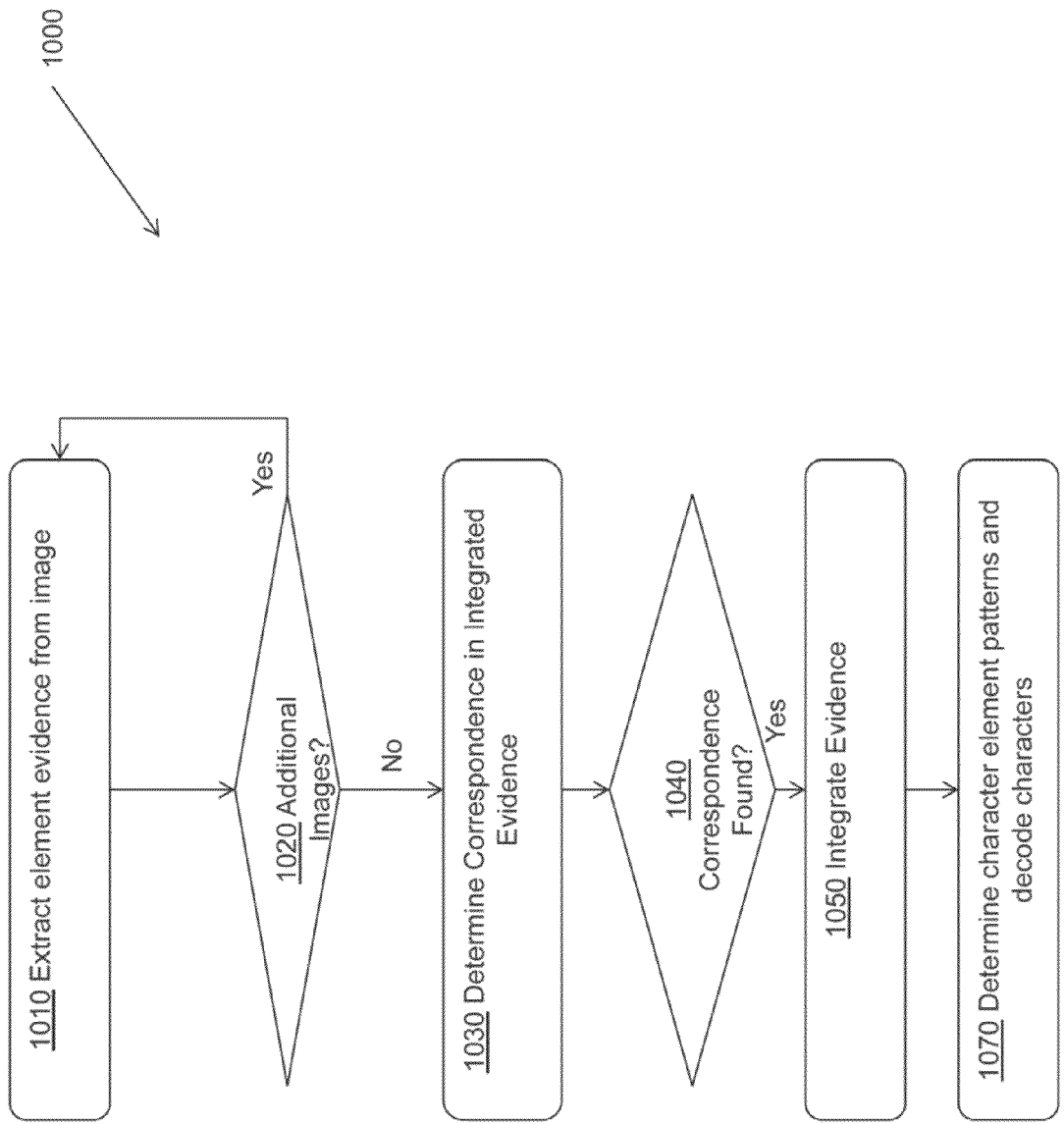
FIG. 10 depicts a flowchart illustrating a method of decoding.
Figure 11:
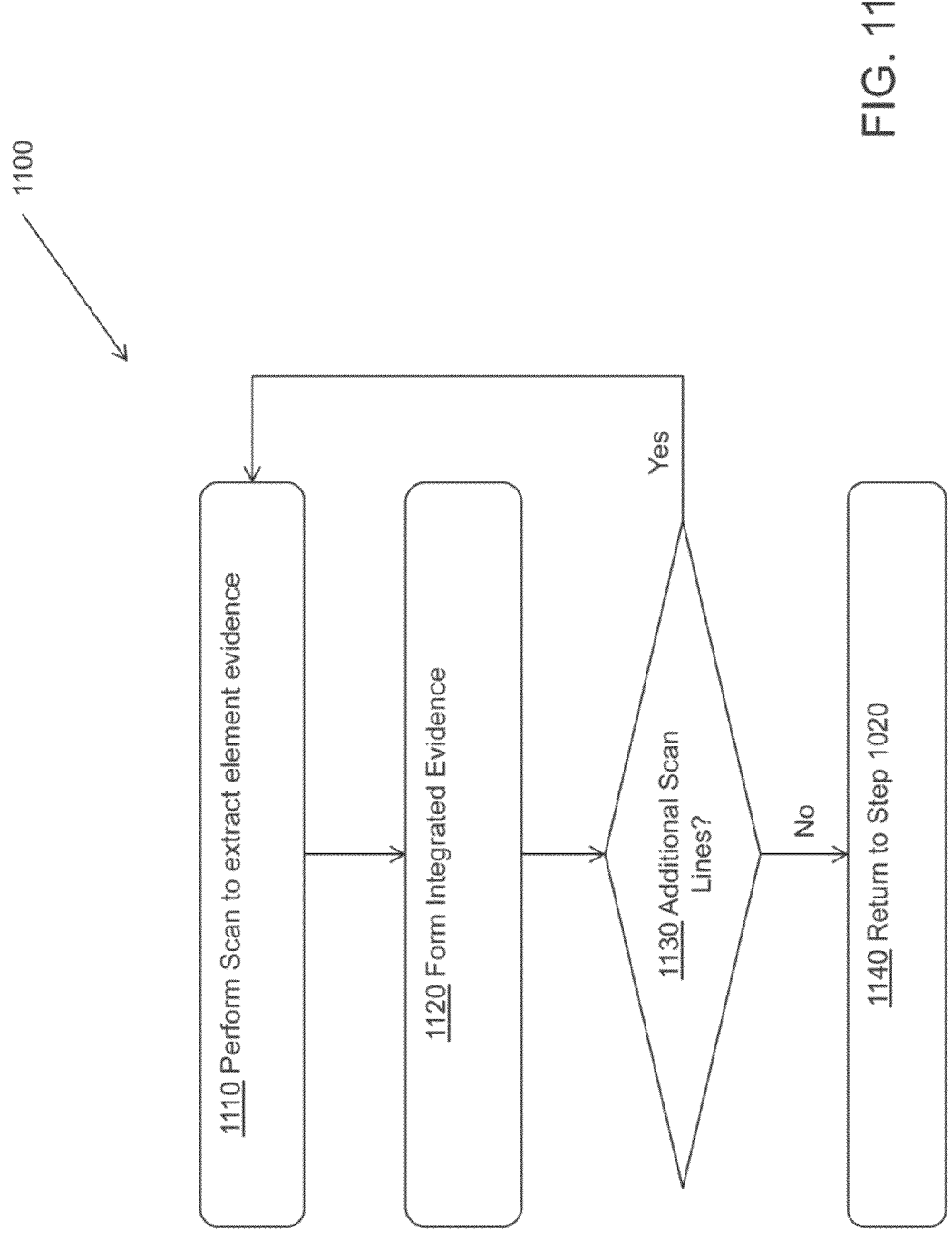
FIG. 11 depicts a flowchart illustrating an implementation of a step of FIG. 10.

FIG. 10 depicts flowchart 1000 illustrating a method of decoding a barcode based on multiple images of the barcode. At step 1010, element evidence is extracted from a first image. FIG. 11 depicts flowchart 1100 illustrating an implementation of step 1010. At step 1110, a scan along a first scan line is performed on the image to extract element evidence. For example, with respect to partial barcode 305, a scan along scan line 315 can be performed to extract element evidence for each element in partial barcode 305. For example, in the case of partial barcode 305, each element can be interpreted as one, two, three, or four modules wide. In some embodiments, each scan along a scan line can contribute 1.0 units of evidence to interpretations of each element.

Figures 12A, 12B, 12C:
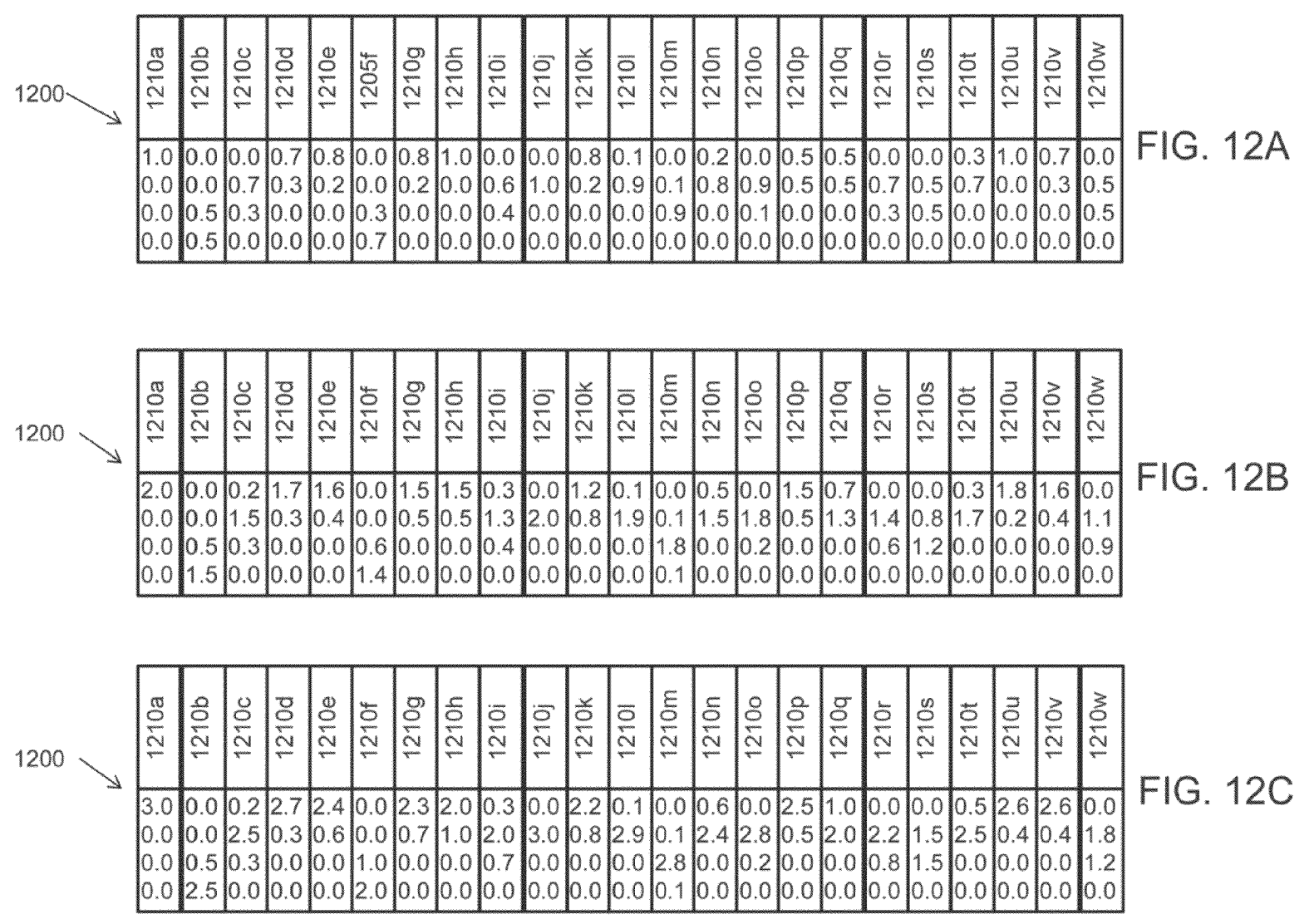

FIG. 12A illustrates element evidence 710*a*-710*w* for elements 310*a*-310*w* after the element evidence has been extracted for scan line 315. The four numbers shown for each element indicate the amount of evidence for interpreting the element as one module, two modules wide, three modules wide, and four modules wide. For example, element evidence 1210*a* for element 310*a* shows 1.0 units of evidence for interpreting element 310*a* as one module wide (e.g., indicating the module 310*a* was measured at nearly exactly one module wide). Element evidence 1210*b* for element 310*a* shows 0.5 units of evidence for interpreting element 310*b* as 3 modules wide and 0.5 units of evidence for interpreting element 310*b* as 4 modules wide (e.g., indicating that module 310*b* was measured at approximately 3.5 modules wide along scan line 315). Similar element evidence can be collected for each other element.

At step 1120, the evidence from the current scan line is integrated into previously stored integrated element evidence for the image, if any. In the instance of the first scan line 315 there may not be any stored integrated element evidence. At step 1130, it is determined if there are additional scan lines for which to extract element evidence. With respect to partial barcode 305, scan lines 320 and 325 remain. If there are additional scan lines, the method can proceed to step 1110. At step 1110, a scan along the next scan line is performed on the image to extract element evidence. For example, with respect to partial barcode 305, a scan along scan line 320 can be performed as described above. At step 1120, the element evidence from the scan along scan line 320 is integrated into the stored integrated evidence (e.g., the element evidence from the scan along scan line 315). In some embodiments, this is done by adding the evidence of possible interpretations for each element. FIG. 12B illustrates integrated element evidence 1205*a*-1205*w* for elements 310*a*-310*w* after the element evidence for scan line 320 has been integrated. As illustrated, each element has a total of 2.0 units of evidence spread across one or more possible interpretations for the element.

At step 1130, it is determined if there are additional scan lines for which to extract element evidence. With respect to partial barcode 305, scan line 325 remains. At step 1110, a scan along the next scan line is performed on the image to extract element evidence. For example, with respect to partial barcode 305, a scan along scan line 325 can be performed as described above. At step 1120, the element evidence from the scan along scan line 325 is integrated into the stored integrated evidence (e.g., the integrated element evidence from the scans along scan lines 315 and 320). FIG. 12C illustrates the integrated element evidence 1210a-1210w for elements 310a-310w after the element evidence for scan line 325 has been integrated. As illustrated, each element has a total of 3.0 units of evidence spread across one or more possible interpretations for the element.

If there are no additional scan lines for which to extract element evidence, the method proceeds to step 1020 of FIG. 10. At step 1020, it is determined whether there are any other images from which to extract element evidence. If there are additional images, step 1010 can be performed for each additional image. For example, with respect to partial barcode 405, element evidence can be extracted as described above. FIG. 13 illustrates integrated element evidence 1310a-1310w for elements 410a-410w after the element evidence for three scan lines has been extracted and integrated. As illustrated, each element has a total of 3.0 units of evidence spread across one or more possible interpretations for the element. If there are additional images, the method proceeds to step 1010, as previously described.

If there are no additional images, the method proceeds to step 1030. At step 1030, it is determined whether the integrated evidence from each of the images corresponds to the integrated evidence from other images. The technology can include comparing the integrated element evidence from one image to the integrated element evidence from another image to determine if there are overlapping patterns of element evidence that indicate the images include overlapping parts of the barcode. In some embodiments, a potential correspondence can be evaluated by calculating the normalized correlation between the integrated element evidence from one image and the integrated element evidence from another image at a plurality of potential correspondences. The potential correspondence with the greatest normalized correlation across all integrated element evidence, and that exceeds a pre-determined threshold, can be considered the correct correspondence.

FIG. 14 illustrates integrated element evidence 1200 from partial barcode 305 and integrated evidence 1300 from partial barcode 405. Integrated evidence 1200 and integrated evidence 1300 can be evaluated at various alignments to determine if there is a correspondence at any alignment. As illustrated, based on the integrated evidence, integrated evidence 1210e-1210w correspond to integrated element evidence 1310a-1310s. This can suggest that elements 310e-310w of partial barcode 305 correspond to elements 410a-410s of partial barcode 405.

At step 1040, it is determined whether a correspondence has been found. If a correspondence is found, the method proceeds to step 1050. At step 1050, the integrated evidence from the two images is integrated. Referring to FIG. 14, integrated evidence 1400 depicts the result of integrating integrated element evidence 1200 and integrated element evidence 1300 in accordance with the determined correspondence. For example, as noted above, integrated element evidence 1210e corresponds to integrated element evidence 1310a. These can be integrated by adding the respective evidence for each possible interpretation to form integrated element evidence 1410e. The evidence from the remaining elements can be similarly integrated as illustrated to form integrated element evidence for complete barcode 205. Evidence from additional images can be integrated in a similar manner. At step 1070, character element patterns can be determined (e.g., sets of elements corresponding to characters) and the characters can be decoded. For example, for a particular element, the interpretation with the greatest amount of evidence can be selected as the interpretation for that element. Elements can then be grouped and decoded in accordance with the appropriate decoding standard.

The technology can be utilized in a variety of barcode reading systems. For example, as described above, the technology can be used in a machine vision system with a machine vision processor and one or more area scan or line scan cameras. The technology can be utilized in a system with a laser scanner. For example, a laser scanner can be used to acquire one or more scan signals for the barcode. The techniques described above can be employed to extract evidence for sub-character barcode features from the signals as described. For example, a scan signal can be acquired using a laser scanner, e.g., as described in Palmer, Roger C., *The Bar Code Book: A Comprehensive Guide to Reading, Printing, Specifying, Evaluating and Using Bar Code and Other Machine-readable Symbols*, Victoria, B.C.: Trafford, 2007, the entire contents of which are hereby incorporated by reference.

The technology can extract sub-character barcode feature evidence from one or more images from a single camera and/or one or more images from multiple cameras. As used herein, image can refer to an image or a portion thereof. For example, an image can be composed of multiple regions (e.g., with each region containing at least a portion of the barcode). The technology can extract sub-character barcode feature evidence from a first image, where the first image corresponds to a first region of a larger image. Similarly, the technology can extract evidence from a second image, where the second image is a second region of the larger image. U.S. Pat. No. 8,646,690, titled "System and method for expansion of field of view in a vision system" and issued on Feb. 11, 2014, the entire contents of which are hereby incorporated by reference, describes a system for expanding a field of view of a camera by using optics configured to project different portions of the expanded field of view onto the camera's sensor. In some applications, the optics can be configured to project a left part of the field of view on the top half of the camera's sensor and a right half of the field of view on the bottom half of the camera's sensor. In some applications, the optics can be configured to project a first field of view on the top half of the camera's sensor and a second field of view on the bottom half of the camera's sensor, where the first and second fields of view are disjoint, from different perspective, etc. Using the systems for expanding the field of view can result in the images captured by the camera being shorter in height, but wider in width than the camera's native aspect ratio because the height of the camera's sensor is divided between the multiple portions of the expanded field of view. As a result, when a barcode passes through the field of view perpendicular to the field's width, there can be an increased likelihood that only a portion of the barcode is captured. The technology described herein can be used to integrate the sub-character barcode feature evidence from one or more images acquired at separate time and/or for one or more images of the barcode appearing in a single, larger image.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A barcode reading system for decoding at least a portion of a barcode comprising:
   a barcode scanner;
   a signal processor connected to the barcode scanner, wherein the signal processor is configured to:
      store first integrated sub-character barcode feature evidence for the barcode, the first integrated sub-character barcode feature evidence comprising evidence for a first plurality of possible sub-character barcode feature interpretations for a first plurality of sub-character barcode features of the barcode;
      acquire, from the barcode scanner, a first scan signal for at least a first portion of the barcode;
      extract, from the first scan signal, sub-character barcode feature measurements for a second plurality of sub-character barcode features;
      determine first sub-character barcode feature evidence for the second plurality of sub-character barcode features based on the sub-character barcode feature measurements for the second plurality of sub-character barcode features, the first sub-character barcode feature evidence comprising evidence for a second plurality of possible sub-character barcode feature interpretations for the second plurality of sub-character barcode features;
      determine whether a first portion of the first integrated sub-character barcode feature evidence corresponds to a second portion of the first sub-character barcode feature evidence;
      integrate the first sub-character barcode feature evidence into the first integrated sub-character barcode feature evidence if the first portion of the first integrated sub-character barcode feature evidence corresponds to the second portion of the integrated sub-character barcode feature evidence; and
      determine one or more character values from the first integrated sub-character barcode feature evidence.

2. The system of claim 1, wherein the first integrated sub-character barcode feature evidence is first integrated element evidence, the first integrated element evidence comprising evidence for a first plurality of possible element interpretations for a first plurality of elements.

3. The system of claim 1, wherein the first integrated sub-character barcode feature evidence is first integrated edge-to-similar-edge feature evidence, the first integrated edge-to-similar-edge feature evidence comprising evidence for a first plurality of possible edge-to-similar-edge feature interpretations for a first plurality of edge-to-similar-edge features.

4. The system of claim 1, wherein the first integrated sub-character barcode feature evidence is first integrated module location evidence, the first integrated module location evidence comprising evidence for a first plurality of possible module location interpretations for a first plurality of module locations.

5. The system of claim 1, wherein the first integrated sub-character barcode feature evidence is first integrated character evidence, the first integrated character evidence comprising evidence for a first plurality of possible element interpretations for a first plurality of elements associated with a character of the barcode.

6. The system of claim 1, wherein the barcode scanner is a camera.

7. The system of claim 1, wherein the barcode scanner is a laser scanner.

8. The system of claim 1, wherein the signal processor is configured to determine the first sub-character barcode feature evidence for the second plurality of sub-character barcode features based on the sub-character barcode feature measurements for the second plurality of sub-character barcode feature by applying one or more evidence functions to each of the sub-character barcode feature measurements.

9. The system of claim 1, wherein the signal processor is configured to determine whether a first portion of the first integrated sub-character barcode feature evidence corresponds to a second portion of the first sub-character barcode feature evidence by calculating a correlation between the first integrated sub-character barcode feature evidence and the first sub-character barcode feature evidence.

10. The system of claim 1, wherein the first plurality of possible sub-character barcode feature interpretations for a first plurality of sub-character barcode features of the barcode comprises all possible sub-character barcode feature interpretations for the first plurality of sub-character barcode features.

11. A method performed by a barcode reading system for decoding at least a portion of a barcode comprising:
    storing, by the barcode reading system, first integrated sub-character barcode feature evidence for the barcode, the first integrated sub-character barcode feature evidence comprising evidence for a first plurality of possible sub-character barcode feature interpretations for a first plurality of sub-character barcode features of the barcode;
    acquiring, by the barcode reading system, from a barcode scanner, a first scan signal for at least a first portion of the barcode;
    extracting, by the barcode reading system, from the first scan signal, sub-character barcode feature measurements for a second plurality of sub-character barcode features;
    determining, by the barcode reading system, first sub-character barcode feature evidence for the second plurality of sub-character barcode features based on the sub-character barcode feature measurements for the second plurality of sub-character barcode features, the first sub-character barcode feature evidence comprising evidence for a second plurality of possible sub-character barcode feature interpretations for the second plurality of sub-character barcode features;
    determining, by the barcode reading system, whether a first portion of the first integrated sub-character barcode feature evidence corresponds to a second portion of the first sub-character barcode feature evidence;
    integrating, by the barcode reading system, the first sub-character barcode feature evidence into the first integrated sub-character barcode feature evidence if the first portion of the first integrated sub-character barcode feature evidence corresponds to the second portion of the integrated sub-character barcode feature evidence; and
    determining, by the barcode reading system, one or more character values from the first integrated sub-character barcode feature evidence.

12. The method of claim 11, wherein the first integrated sub-character barcode feature evidence is first integrated element evidence, the first integrated element evidence comprising evidence for a first plurality of possible element interpretations for a first plurality of elements.

13. The method of claim 11, wherein the first integrated sub-character barcode feature evidence is first integrated edge-to-similar-edge feature evidence, the first integrated edge-to-similar-edge feature evidence comprising evidence for a first plurality of possible edge-to-similar-edge feature interpretations for a first plurality of edge-to-similar-edge features.

14. The method of claim 11, wherein the first integrated sub-character barcode feature evidence is first integrated module location evidence, the first integrated module location evidence comprising evidence for a first plurality of possible module location interpretations for a first plurality of module locations.

15. The method of claim 11, wherein the first integrated sub-character barcode feature evidence is first integrated character evidence, the first integrated character evidence comprising evidence for a first plurality of possible element interpretations for a first plurality of elements associated with a character of the barcode.

16. The method claim 11, wherein the barcode scanner is a camera.

17. The method of claim 11, wherein the barcode scanner is a laser scanner.

18. The method of claim 11, further comprising:
    applying, by the barcode reading system, one or more evidence functions to each of the sub-character barcode feature measurements.

19. The method of claim 11, further comprising:
    calculating a correlation between the first integrated sub-character barcode feature evidence and the first sub-character barcode feature evidence.

20. The method of claim 11, wherein the first plurality of possible sub-character barcode feature interpretations for a first plurality of sub-character barcode features of the barcode comprises all possible sub-character barcode feature interpretations for the first plurality of sub-character barcode features.

* * * * *